US009628643B2

(12) United States Patent
Oguma et al.

(10) Patent No.: US 9,628,643 B2
(45) Date of Patent: Apr. 18, 2017

(54) MOBILE DEVICE THAT ENSURES FUNCTION EXTENSION OF IMAGE FORMING APPARATUS, IMAGE FORMING SYSTEM, AND RECORDING MEDIUM

(71) Applicant: KYOCERA Document Solutions Inc., Osaka (JP)

(72) Inventors: Takashi Oguma, Osaka (JP); Masafumi Sato, Osaka (JP); Zhen yu Sun, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/051,184

(22) Filed: Feb. 23, 2016

(65) Prior Publication Data

US 2016/0255220 A1 Sep. 1, 2016

(30) Foreign Application Priority Data

Feb. 27, 2015 (JP) ................................. 2015-039562

(51) Int. Cl.
*H04N 1/00* (2006.01)
*G06F 3/0484* (2013.01)
*H04N 1/32* (2006.01)

(52) U.S. Cl.
CPC ..... *H04N 1/00392* (2013.01); *G06F 3/04842* (2013.01); *G06F 3/04847* (2013.01); *H04N 1/0097* (2013.01); *H04N 1/00244* (2013.01); *H04N 1/00307* (2013.01); *H04N 1/00411* (2013.01); *H04N 1/00474* (2013.01); *H04N 1/00493* (2013.01); *H04N 1/00514* (2013.01); *H04N 1/00854* (2013.01); *H04N 1/00973* (2013.01); *H04N 1/32117* (2013.01); *H04N 1/32122* (2013.01); *H04N 2201/006* (2013.01); *H04N 2201/0018* (2013.01); *H04N 2201/0039* (2013.01); *H04N 2201/0075* (2013.01); *H04N 2201/0094* (2013.01); *H04N 2201/3233* (2013.01); *H04N 2201/3246* (2013.01);
(Continued)

(58) Field of Classification Search
None
See application file for complete search history.

(56) References Cited

U.S. PATENT DOCUMENTS

2012/0154848 A1* 6/2012 Fukudome ............ G06F 3/1204
358/1.14
2012/0250066 A1* 10/2012 Kikumoto ............ G06F 3/1222
358/1.14
(Continued)

FOREIGN PATENT DOCUMENTS

JP 2011-238006 A 11/2011

*Primary Examiner* — Ming Hon
(74) *Attorney, Agent, or Firm* — Stein IP, LLC (57) ABSTRACT

A mobile device includes an operation circuit, a display, an operation screen display, and a function execution circuit. The operation screen display displays an operation screen to operate the image forming apparatus on the display. The function execution circuit performs a function other than a function executable by the image forming apparatus alone and a specific function performed using the image forming apparatus. The function execution circuit performs the specific function according to an operation to an operation part in the operation screen displayed on the display via the operation circuit.

3 Claims, 10 Drawing Sheets

(52) U.S. Cl.
CPC ............... *H04N 2201/3273* (2013.01); *H04N 2201/3276* (2013.01)

(56) References Cited

U.S. PATENT DOCUMENTS

| | | | | |
|---|---|---|---|---|
| 2013/0003106 A1* | 1/2013 | Nishida | ................ | G06F 3/1222 358/1.14 |
| 2013/0070288 A1* | 3/2013 | Muranaka | ............. | G06F 3/1204 358/1.15 |
| 2013/0094053 A1* | 4/2013 | Shirai | ................ | G06F 3/1222 358/1.15 |
| 2013/0314735 A1* | 11/2013 | Homma | ............ | H04N 1/00244 358/1.14 |
| 2014/0226171 A1* | 8/2014 | Tredoux | ............ | H04N 1/00225 358/1.13 |
| 2014/0355058 A1* | 12/2014 | Matsuhara | ......... | H04N 1/00381 358/1.15 |
| 2015/0002872 A1* | 1/2015 | Naruse | .............. | H04N 1/00217 358/1.13 |
| 2015/0186087 A1* | 7/2015 | Miyazawa | ........... | G06F 3/1253 358/1.15 |
| 2015/0256693 A1* | 9/2015 | Kubo | ................ | H04N 1/00506 358/1.15 |
| 2016/0094732 A1* | 3/2016 | Nakamura | ......... | H04N 1/00244 358/440 |

\* cited by examiner

MOBILE DEVICE THAT ENSURES FUNCTION EXTENSION OF IMAGE FORMING APPARATUS, IMAGE FORMING SYSTEM, AND RECORDING MEDIUM

INCORPORATION BY REFERENCE

This application is based upon, and claims the benefit of priority from, corresponding Japanese Patent Application No. 2015-039562 filed in the Japan Patent Office on Feb. 27, 2015, the entire contents of which are incorporated herein by reference.

BACKGROUND

Unless otherwise indicated herein, the description in this section is not prior art to the claims in this application and is not admitted to be prior art by inclusion in this section.

A typical image forming system generates an operation screen for mobile device from screen data used for screen display in the image forming apparatus by a server. The typical image forming system causes the mobile device to display the generated operation screen.

SUMMARY

A mobile device according to one aspect of the disclosure includes an operation circuit, a display, an operation screen display, and a function execution circuit. The operation screen display displays an operation screen to operate the image forming apparatus on the display. The function execution circuit performs a function other than a function executable by the image forming apparatus alone and a specific function performed using the image forming apparatus. The function execution circuit performs the specific function according to an operation to an operation part in the operation screen displayed on the display via the operation circuit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure with reference to the drawings.

First, the following describes a configuration of an image forming system according to the embodiment.

Figure 1:
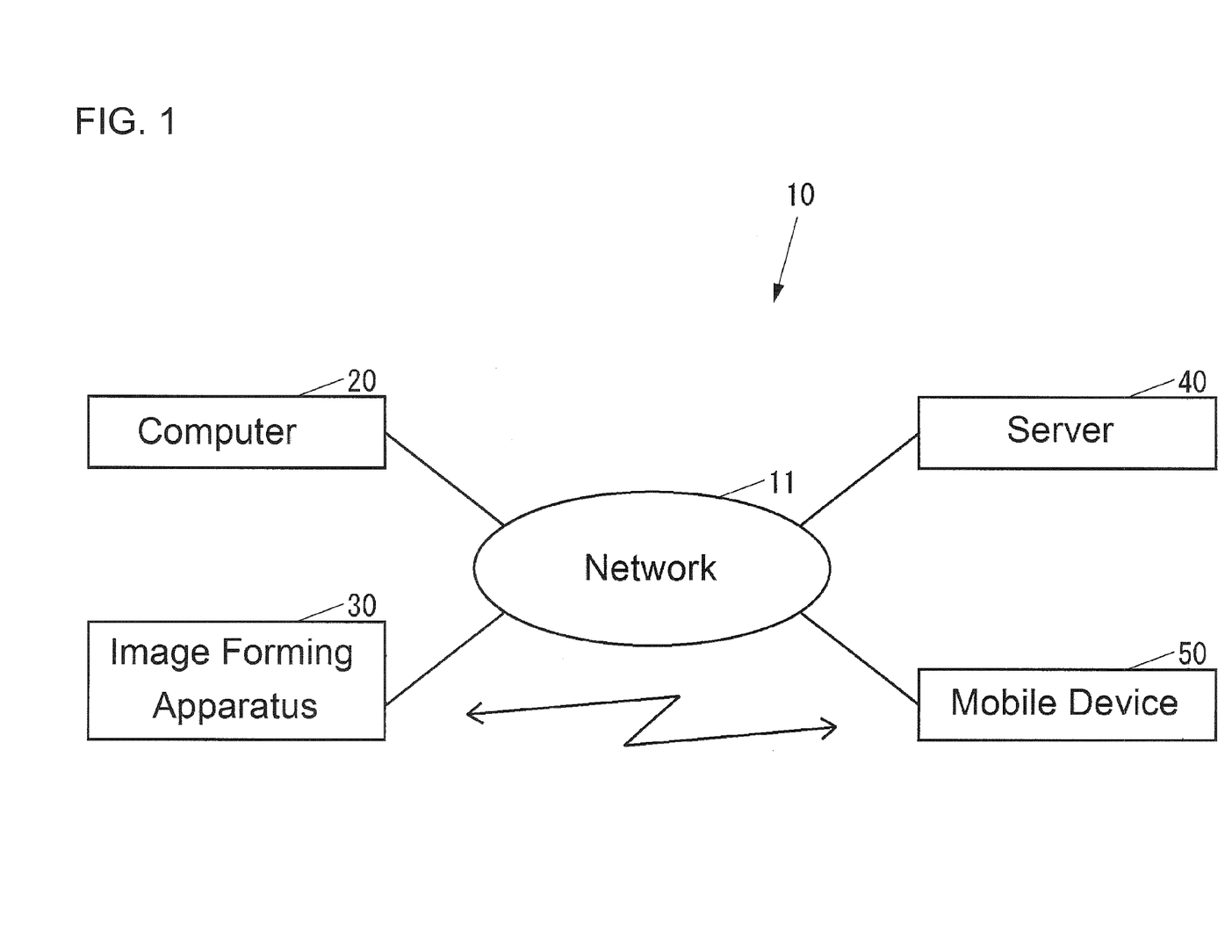
FIG. 1 illustrates a block diagram of an image forming system according to one embodiment of the disclosure.

FIG. 1 illustrates an image forming system 10 according to the embodiment.

As illustrated in FIG. 1, the image forming system 10 includes a computer 20, an image forming apparatus 30, a server 40, and a mobile device 50. The computer 20, such as a Personal Computer (PC), generates print data. The image forming apparatus 30 performs print jobs based on the print data. The server 40 manages operation screens for the image forming apparatus 30 for each user. The user carries the mobile device 50.

The image forming system 10 is configured to include a large number of computers as well as the computer 20. However, for ease of understanding, the following omits the description of the computers other than the computer 20. Similarly, the image forming system 10 is configured to include a large number of image forming apparatuses as well as the image forming apparatus 30. However, for ease of understanding, the following omits the description of the image forming apparatus other than the image forming apparatus 30. Similarly, the image forming system 10 is configured to include a large number of mobile devices as well as the mobile device 50. However, for ease of understanding, the following omits the description of the mobile devices other than the mobile device 50.

The computer 20 and the server 40 are connectable to one another via a network 11, such as a Local Area Network (LAN) and the Internet. Similarly, the image forming apparatus 30 and the server 40 are connectable to one another via the network 11, such as the LAN and the Internet. Similarly, the mobile device 50 and the server 40 are connectable to one another via the network 11, such as the LAN and the Internet.

The image forming apparatus 30 and the mobile device 50 are connectable to one another by short range wireless communication such as a Near Field Communication (NFC). The image forming apparatus 30 and the mobile device 50 are also connectable to one another via the network 11, such as the LAN and the Internet.

The image forming apparatus 30 is, for example, a Multifunction Peripheral (MFP) and a printer-only machine.

The server 40 is configured of one or more computers such as the PC.

The mobile device 50 is, for example, a smart phone and a tablet.

Figure 2:
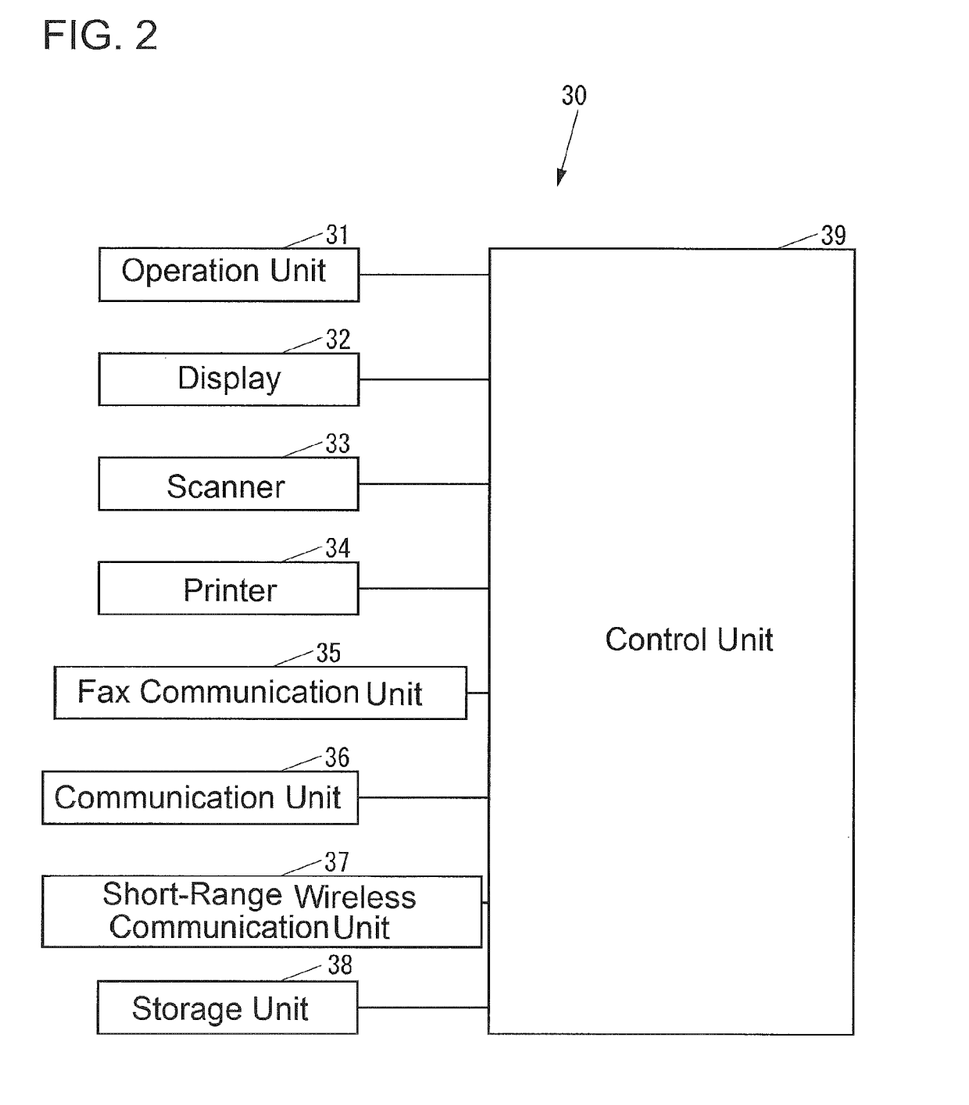
FIG. 2 illustrates a block diagram of an image forming apparatus according to one embodiment.

FIG. 2 illustrates the image forming apparatus 30.

As illustrated in FIG. 2, the image forming apparatus 30 includes an operation unit 31, a display 32, a scanner 33, a printer 34, a fax communication unit 35, a communication unit 36, a short-range wireless communication unit 37, a storage unit 38, and a control unit 39. The operation unit 31 is an input device such as a button for inputting various operations by a user. The display 32 is a display device, such as a liquid crystal display (LCD), which displays various pieces of information. The scanner 33, which is a reading device, reads image data from a document. The printer 34, which is a print device, performs printing on a recording medium such as a paper sheet. The fax communication unit 35, which is a fax device, performs fax communications with an external facsimile device (not illustrated) via a communication line such as a dial-up line. The communication unit 36, which is a communication device, communicates with an external device via the network 11. The short-range wireless communication unit 37, which is a communication device, performs the short range wireless communications. The storage unit 38, which is a storage device such as an electrically erasable programmable read only memory (EEPROM) and a hard disk drive (HDD), stores various data. The control unit 39 controls the entire image forming apparatus 30. The operation unit 31 is also referred to as an operation circuit.

The control unit 39 includes, for example, a central processing unit (CPU), a read only memory (ROM), which stores a program and various data, and a random access memory (RAM), which is used for a work area of the CPU. The CPU performs a program stored in the ROM or the storage unit 38.

Figure 3:
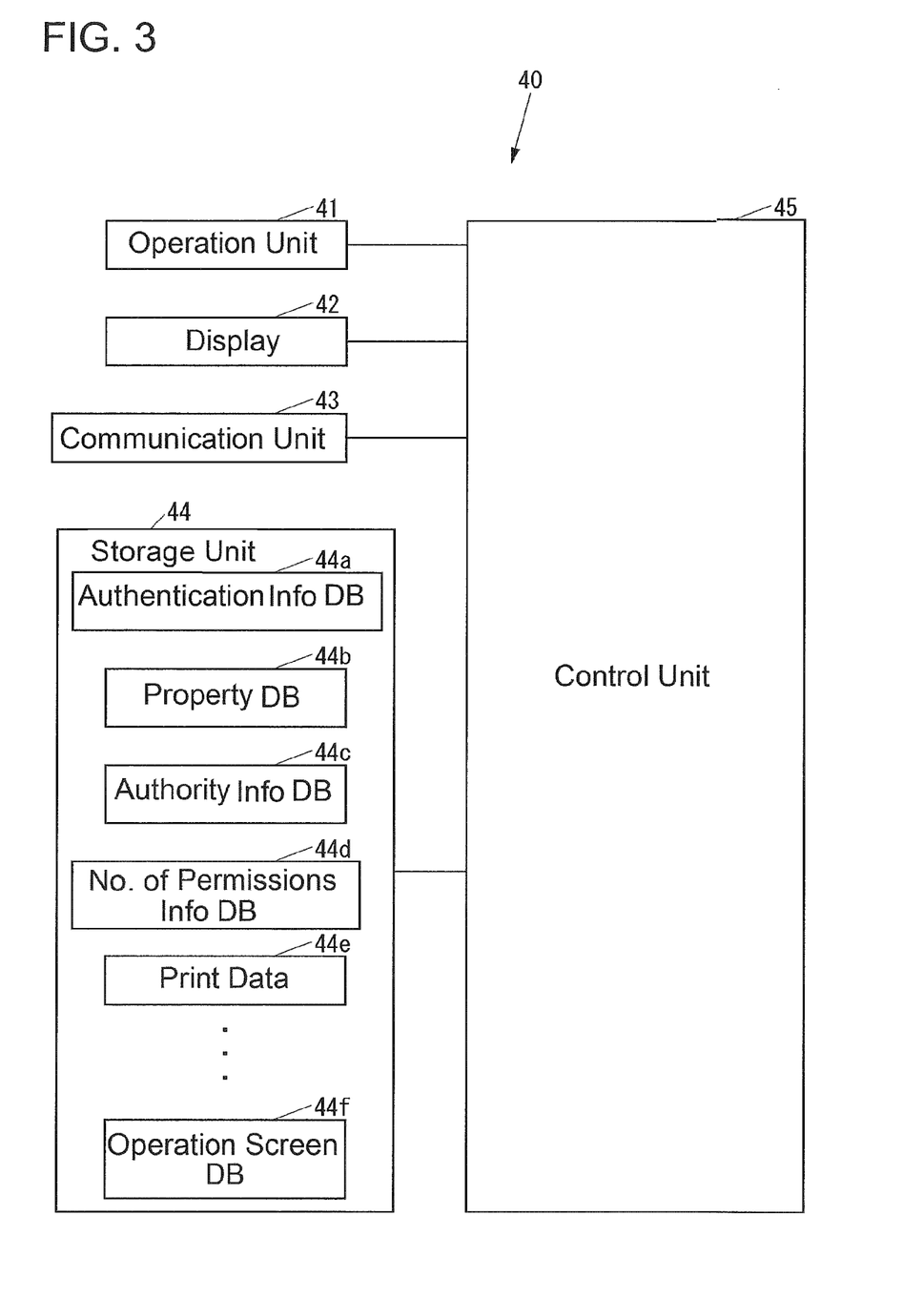
FIG. 3 illustrates a block diagram of a server according to one embodiment.

FIG. 3 illustrates the server 40.

As illustrated in FIG. 3, the server 40 includes an operation unit 41, a display 42, a communication unit 43, a storage unit 44, and a control unit 45. The operation unit 41 is an input device such as a keyboard and a computer mouse to which various operations are input by the user. The display 42, which is a display device such as an LCD, displays various pieces of information. The communication unit 43, which is a communication device, communicates with an external device. The storage unit 44, which is a storage device such as an HDD, stores various data. The control unit 45 controls the entire server 40.

The storage unit 44 stores an authentication information database 44a to manage information for authenticating the user.

The storage unit 44 stores a property database 44b to manage properties of the user. For example, the user's properties include the display name of the user on the display 32 of the image forming apparatus 30, the e-mail address of the user, and, for example, a path of a folder for the user in the server 40. Here, the e-mail address and the path of the folder are, for example, used as one candidate for a transmission destination of an image read by the scanner 33 of the image forming apparatus 30.

The storage unit 44 stores an authority information database 44c to manage information on user's authority for the image forming apparatus (hereinafter referred to as "authority information"). For example, the authority information includes information on presence/absence of respective print authority, copy authority, transmission authority, accumulation authority, USB accumulation authority, and FAX authority. The print authority is to perform printing by the printer 34 based on print data input from the outside of the image forming apparatus 30 to the image forming apparatus 30. The copy authority is to perform printing by the printer 34 based on the image data read by the scanner 33. The transmission authority is to transmit the image data read by the scanner 33 to the outside of the image forming apparatus 30. The accumulation authority is to accumulate the image data read by the scanner 33 in the storage unit 38. The USB accumulation authority is to accumulate the image data read by the scanner 33 in a Universal Serial Bus (USB) memory (not illustrated). The FAX authority is to transmit the image data read by the scanner 33 with FAX via the fax communication unit 35.

The storage unit 44 stores a number of permissions information database 44d. The number of permissions information database 44d is to manage the number of pieces of various information (hereinafter referred to as "number of permissions information") permitted to the user regarding the image forming apparatus. For example, the number of permissions information includes the number of monochrome printing permissions as the number of pages, the number of color printing permissions as the number of pages, the number of monochrome copy permissions as the number of pages, and the number of color copy permissions as the number of pages. The number of monochrome printing permissions is the number of pages within which the monochrome printing by the printer 34 is permitted based on the print data input from the outside of the image forming apparatus 30 to the image forming apparatus 30. The number of color printing permissions is the number of pages within which the color printing by the printer 34 is permitted based on the print data input from the outside of the image forming apparatus 30 to the image forming apparatus 30. The number of monochrome copy permissions is the number of pages within which the monochrome printing by the printer 34 is permitted based on the image data read by the scanner 33. The number of color printing permissions is the number of pages within which the color printing by the printer 34 is permitted based on the image data read by the scanner 33.

The storage unit 44 ensures storing print data 44e for pull print for each user. The print data 44e is transmitted by the computer 20.

The storage unit 44 stores an operation screen database 44f to manage the operation screens for the image forming apparatus 30. The operation screen database 44f manages the operation screens for the image forming apparatus 30 for each user.

The control unit 45, for example, includes the CPU, a ROM, which stores programs and various data, and a RAM used as a work area for the CPU. The CPU executes the programs stored in the ROM or the storage unit 44.

Figure 4:
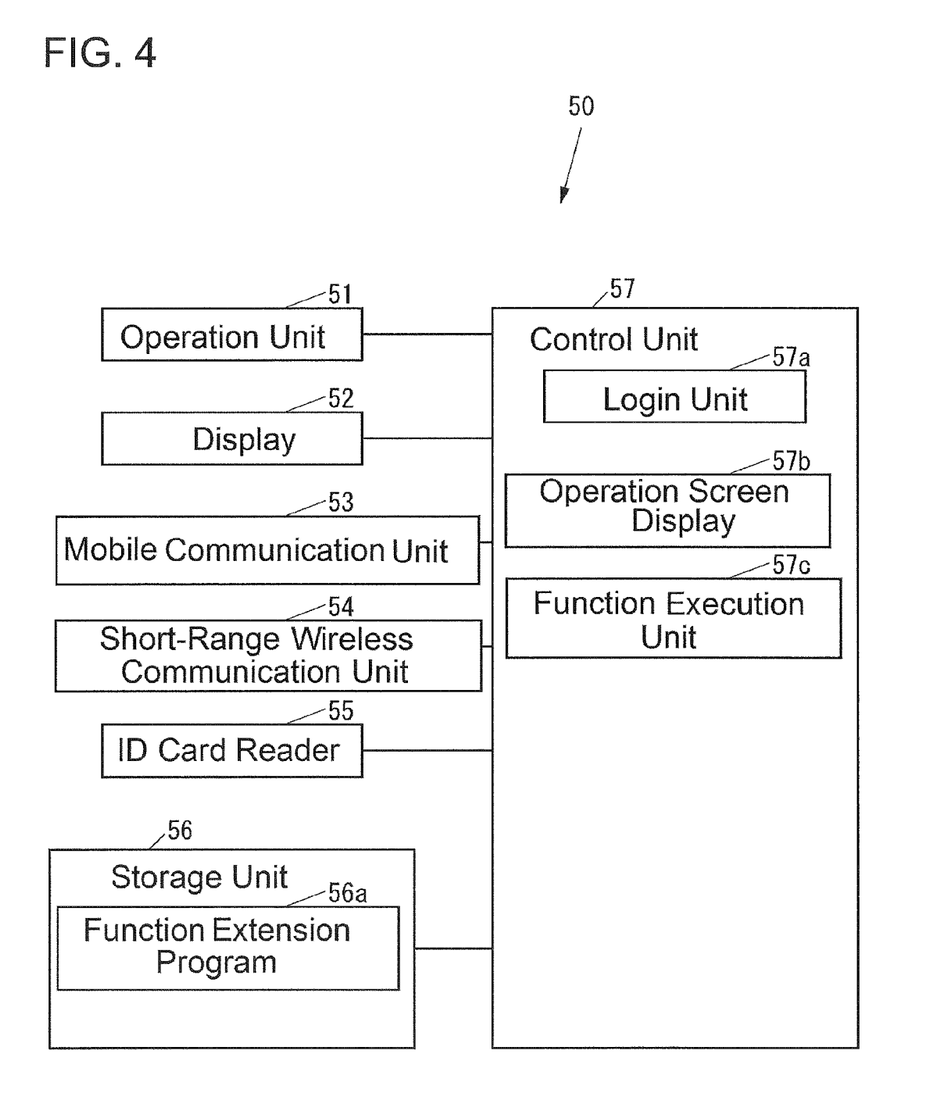
FIG. 4 illustrates a block diagram of a mobile device according to one embodiment.

FIG. 4 illustrates the mobile device 50.

As illustrated in FIG. 4, the mobile device 50 includes an operation unit 51, a display 52, a mobile communication unit 53, a short-range wireless communication unit 54, an ID card reader 55, a storage unit 56, and a control unit 57. The operation unit 51 is an input device such as a button for inputting various operations by the user. The display 52 is a display device, such as an LCD, which displays various pieces of information. The mobile communication unit 53, which is a communication device, performs mobile communications with an external device. The short-range wireless communication unit 54, which is a communication device, performs the short range wireless communications. The ID card reader 55 reads card information from the ID card. The storage unit 56, which is a storage device such as an HDD, stores various data. The control unit 57 controls the entire mobile device 50.

The storage unit 56 stores a function extension program 56a to extend the functions of the image forming apparatus 30. The function extension program 56a may be installed on the mobile device 50 at the production stage of the mobile device 50. The function extension program 56a may be additionally installed from the storage medium such as an SD card on the mobile device 50. The function extension program 56a may be additionally installed from the network 11 on the mobile device 50.

The control unit 57, for example, includes the CPU, a ROM, which stores programs and various data, and a RAM used as a work area for the CPU. The CPU executes the programs stored in the ROM or the storage unit 56.

The control unit 57 performs the function extension program 56a stored in the storage unit 56 to function as a login unit 57a, an operation screen display 57b, and a function execution unit 57c. The login unit 57a performs login to the server 40 (see FIG. 1) for the user. The operation screen display 57b displays the operation screen to operate the image forming apparatus 30 on the display 52. The function execution unit 57c is configured to perform a function other than functions executable by the image forming apparatus 30 alone and a specified function performed using the image forming apparatus 30. The login unit 57a is also referred to as a login circuit. The function execution unit 57c is also referred to as a function execution circuit.

Next, the following describes operations of the image forming system 10.

First, the following describes operations of the image forming system 10 when the user logs in to the server 40 via the image forming apparatus 30.

Figure 5:
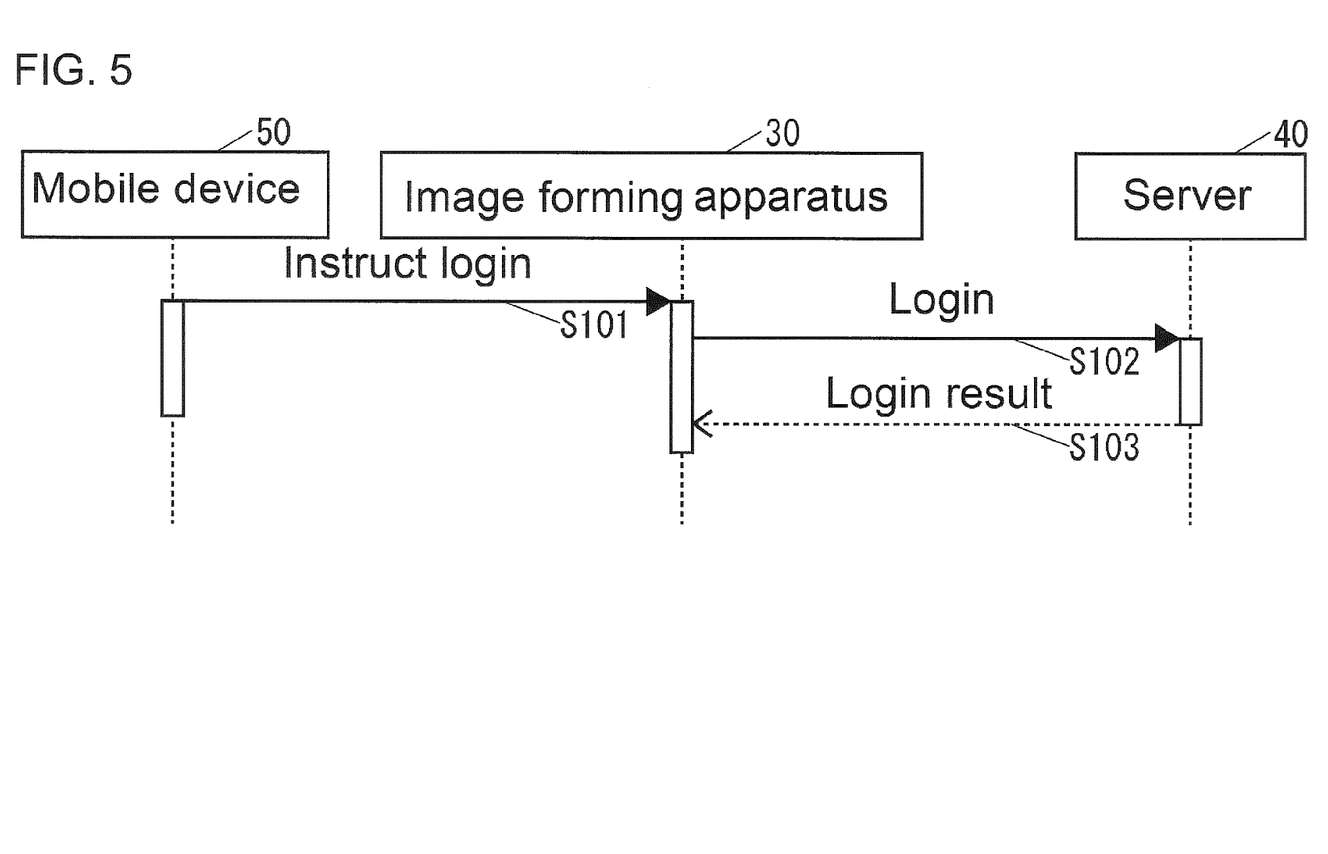
FIG. 5 illustrates a sequence diagram of an operation of the image forming system according to one embodiment for login to the server via the image forming apparatus.

FIG. 5 illustrates the operations of the image forming system 10 when the user logs in to the server 40 via the image forming apparatus 30.

As illustrated in FIG. 5, the user instructs the login to the server 40 via the image forming apparatus 30 to the mobile device 50 via the operation unit 51 of the mobile device 50. Then, the login unit 57a of the mobile device 50 instructs the user's login to the server 40 to the image forming apparatus 30 via the mobile communication unit 53 or the short-range wireless communication unit 54 (S101). Here, the login instruction includes information for authentication of the user. As the information for authentication of the user, any given information is applicable. For example, the information for authentication of the user may be a combination of identification information of the user and a password. Alternatively, the information for authentication of the user may be card information read from an ID card by the ID card reader 55. Even if the image forming apparatus 30 does not include the ID card reader, the image forming system 10 ensures the login based on the card information read from the ID card by the ID card reader 55.

After the process at S101, the control unit 39 of the image forming apparatus 30 requests the login process instructed at S101 to the server 40 (S102). Accordingly, the control unit 45 of the server 40 permits the user's login when the authentication information database 44a includes the information for authentication transmitted from the image forming apparatus 30. Meanwhile, the control unit 45 does not permit the user's login if the authentication information database 44a does not include the information for authentication transmitted from the image forming apparatus 30.

The control unit 45 of the server 40 replies the result of the login process to the image forming apparatus 30 (S103). Here, when the login by the user succeeds, that is, the control unit 45 permits the user's login, the control unit 45 obtains the properties of this user, the authority information, and the number of permissions information from the property database 44b, the authority information database 44c, and the number of permissions information database 44d, respectively. Then, the control unit 45 transmits the information to the image forming apparatus 30 together with the result of the login process. Accordingly, the control unit 39 of the image forming apparatus 30 ensures the use of functions using the properties and restricts the use of the functions according to the authority information and the number of permissions information.

Figure 6:
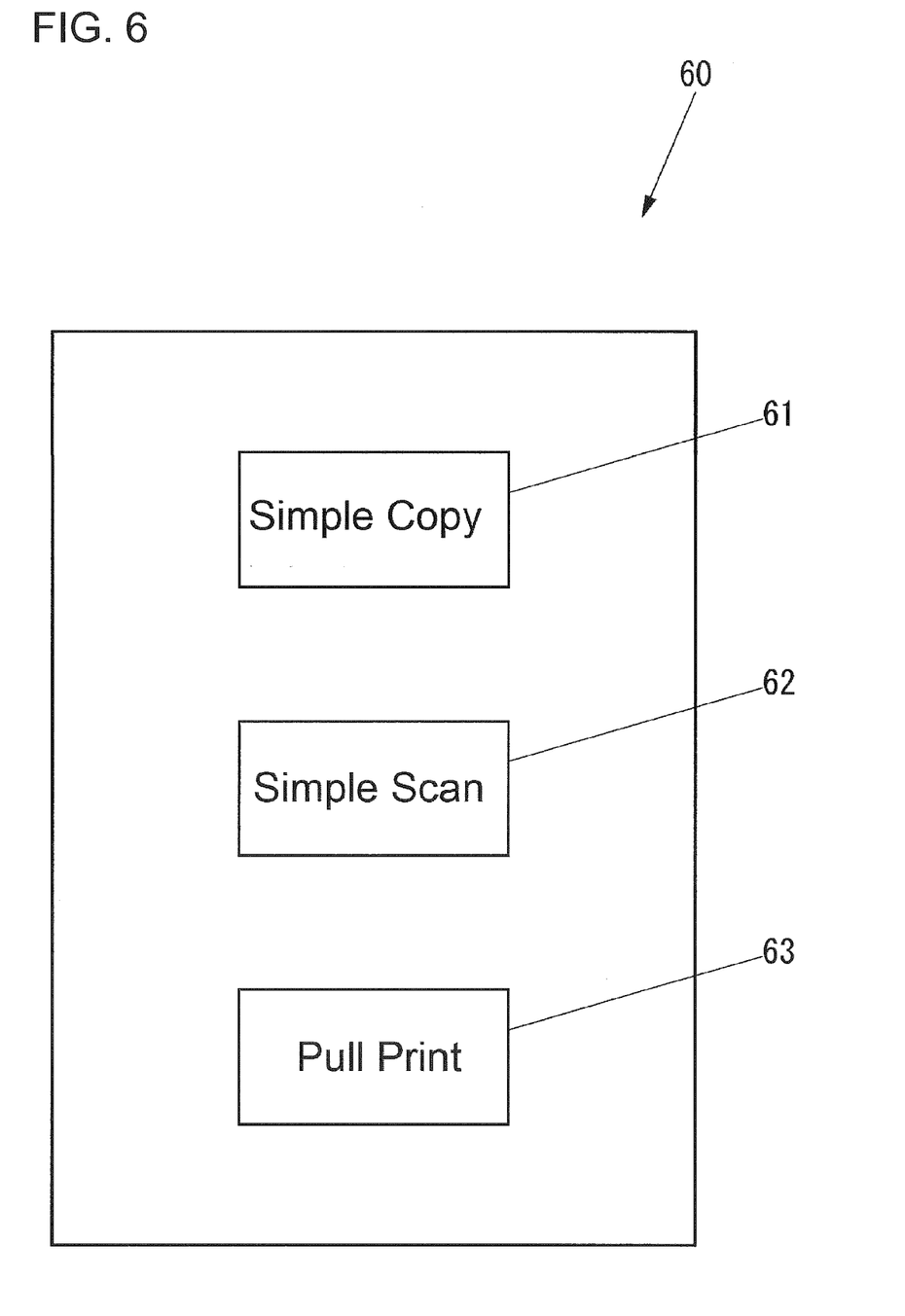
FIG. 6 illustrates a schematic diagram of an example of an operation screen displayed on a display according to one embodiment.

When the login is performed, the operation screen display 57b of the mobile device 50 displays an operation screen 60 as illustrated in FIG. 6 on the display 52.

FIG. 6 illustrates an example of the operation screen 60.

The operation screen 60 illustrated in FIG. 6 includes a simple copy button 61, a simple scan button 62, and a pull print button 63. The simple copy button 61 performs copy corresponding to a preset value. The simple scan button 62 performs scan corresponding to the preset value. The pull print button 63 performs pull print.

The operation screen 60 is optionally customizable, such as addition of button, deletion of button, change of a function made correspond to the button, and change in arrangement of button.

The operation screen display 57b may display the operation screen 60 stored in the storage unit 56 of the mobile device 50 on the display 52. The operation screen display 57b may display the operation screen 60, which is managed by the operation screen database 44f of the server 40 for the user who has succeeded the login by login to the server 40 by the login unit 57a, on the display 52.

Figure 7:
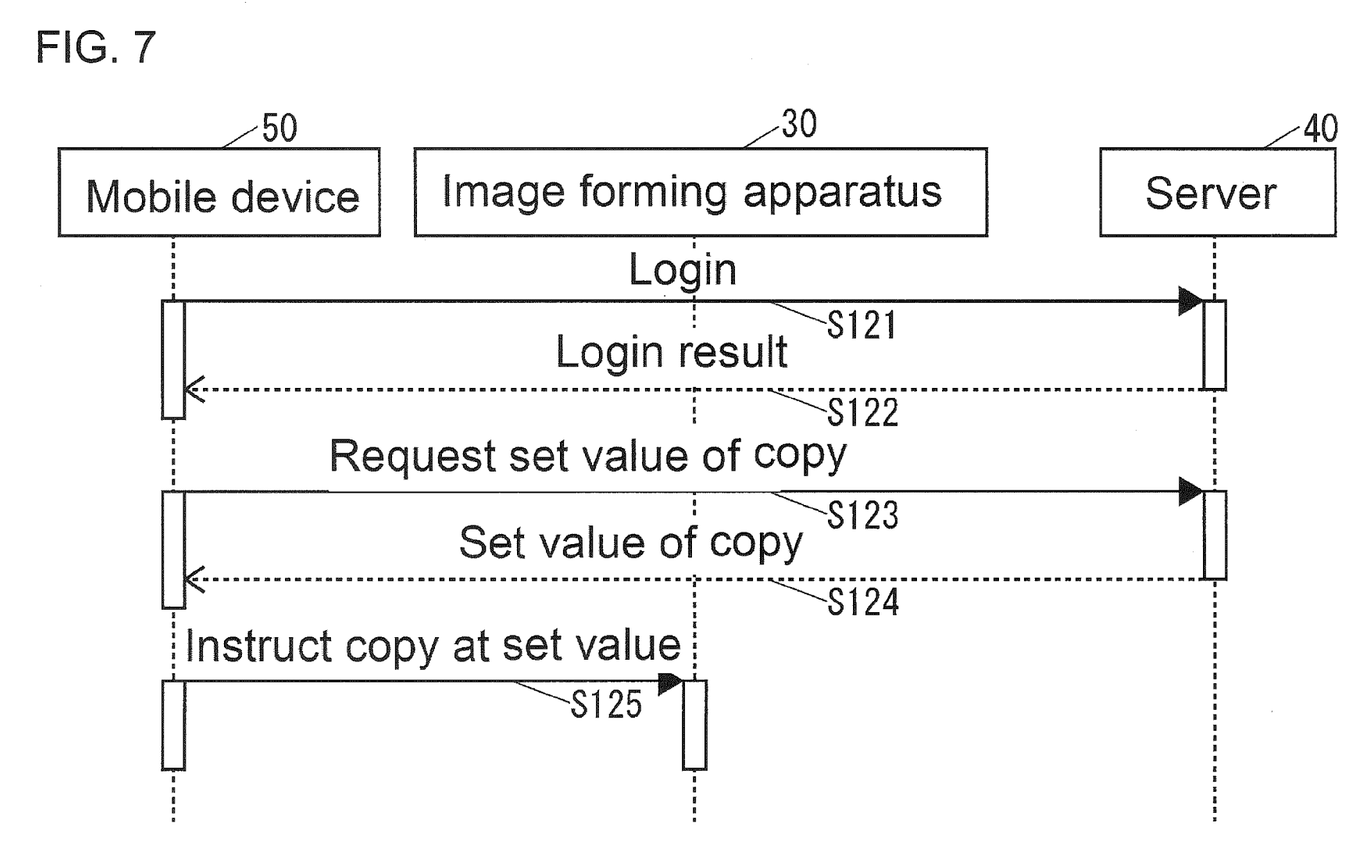
FIG. 7 illustrates a sequence diagram of an operation of the image forming system according to one embodiment when a simple copy button is pressed.

FIG. 7 illustrates operations of the image forming system 10 when the simple copy button 61 is pressed.

As illustrated in FIG. 7, when the simple copy button 61, which is as the operation part of the operation screen 60, is pressed via the operation unit 51, the function execution unit 57c of the mobile device 50 requests the login process to the server 40 (S121). Accordingly, the control unit 45 of the server 40 performs the login process and replies the result of the login process to the mobile device 50 (S122).

When replied as the successful login at S122, the function execution unit 57c of the mobile device 50 requests the set value of the copy associated to the simple copy button 61 and managed by the server 40 to the server 40 (S123). Accordingly, the control unit 45 of the server 40 replies the set value of copy associated to the simple copy button 61 and managed to the mobile device 50 (S124). Here, the set values of copy include various set values, such as a resolution for reading by the scanner 33 and the color of print by the printer 34.

The function execution unit 57c of the mobile device 50 instructs the copy at the set value transmitted from the server 40 to the image forming apparatus 30 to which the user logs in (S125). Accordingly, the control unit 39 of the image forming apparatus 30 performs the copy at the set value transmitted from the mobile device 50.

Figure 8:
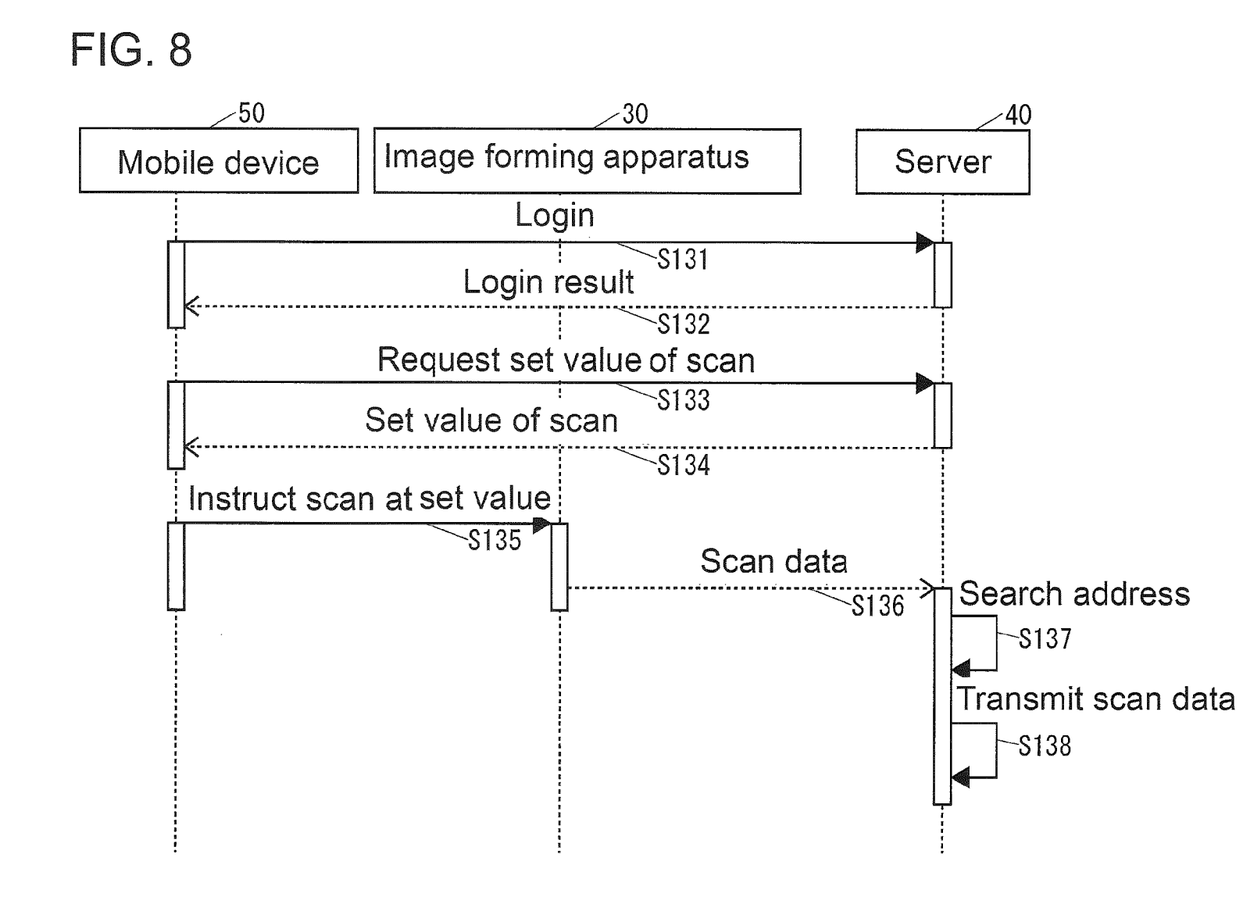
FIG. 8 illustrates a sequence diagram of an operation of the image forming system according to one embodiment when a simple scan button is pressed.

FIG. 8 illustrates operations of the image forming system 10 when the simple scan button 62 is pressed.

As illustrated in FIG. 8, when the simple scan button 62, which is as the operation part of the operation screen 60, is pressed via the operation unit 51, the function execution unit 57c of the mobile device 50 requests the login process to the server 40 (S131). Accordingly, the control unit 45 of the server 40 performs the login process and replies the result of the login process to the mobile device 50 (S132).

When replied as the successful login at S132, the function execution unit 57c of the mobile device 50 requests the set value of the scan associated to the simple scan button 62 and managed by the server 40 to the server 40 (S133). Accordingly, the control unit 45 of the server 40 replies the set value of scan associated to the simple scan button 62 and managed to the mobile device 50 (S134). Here, the set values of scan include various set values, such as a resolution for reading by the scanner 33.

The function execution unit 57c of the mobile device 50 instructs the scan at the set value transmitted from the server 40 to the image forming apparatus 30 to which that user logs in (S135). Accordingly, the control unit 39 of the image forming apparatus 30 performs the scan at the set value transmitted from the mobile device 50.

The function execution unit 57c of the mobile device 50 associates the image data read by the image forming apparatus 30, namely, the scan data with the identification information of the simple scan button 62, namely, the button ID and causes the image forming apparatus 30 to transmit the scan data addressing to the server 40 (S136). Here, the method for associating the scan data with the button ID includes, for example, a method that includes the button ID in the file name of the scan data and a method that assigns the button ID as metadata of the scan data.

When the image forming apparatus 30 transmits the scan data at S136, the control unit 45 of the server 40 searches an address at the set value managed associated to the simple scan button 62. The simple scan button 62 is identified by the button ID transmitted associated to the scan data transmitted from the image forming apparatus 30 (S137). The control unit 45 transmits the scan data to the searched address (S138).

Figure 9:
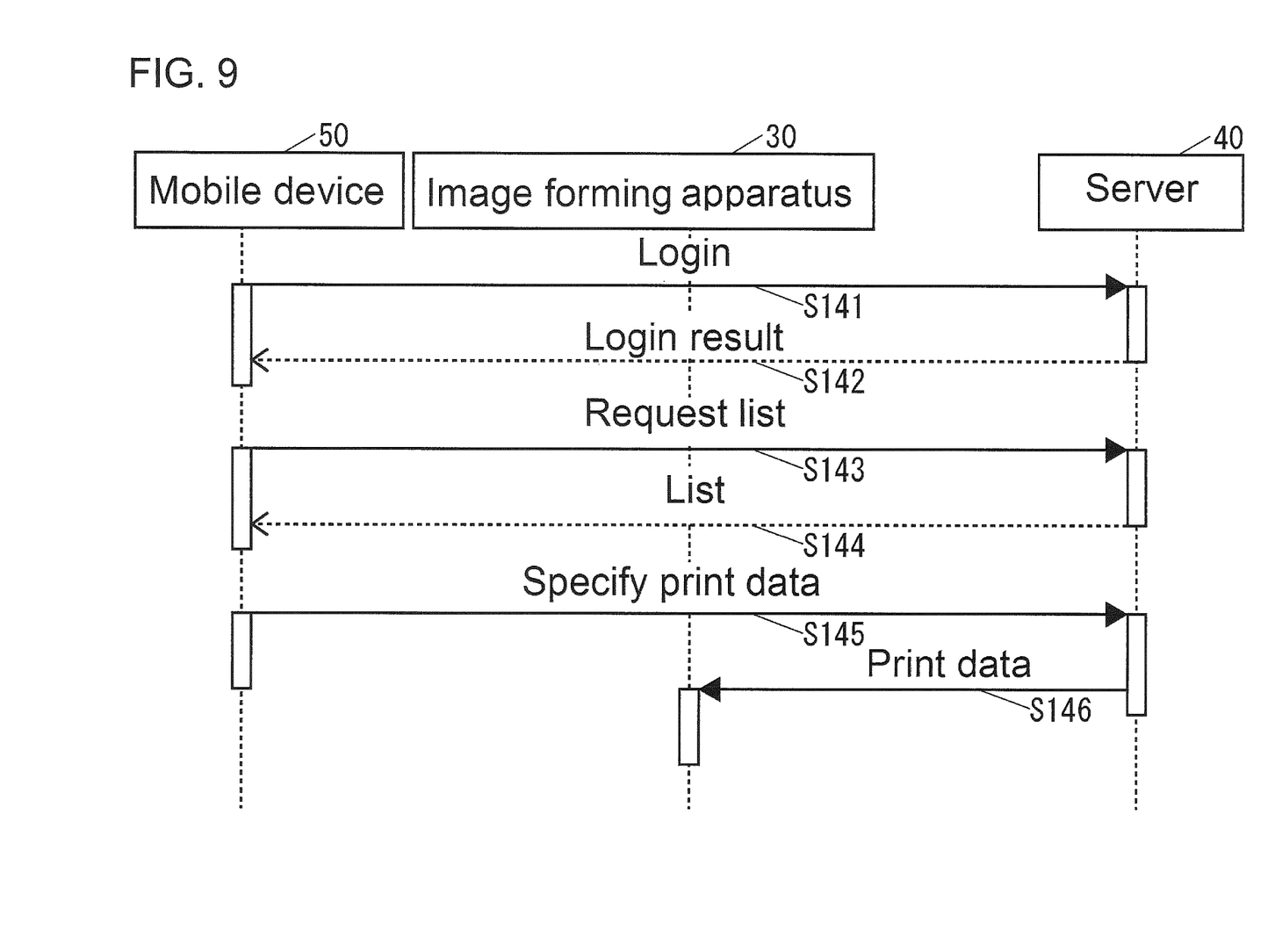
FIG. 9 illustrates a sequence diagram of an operation of the image forming system according to one embodiment when a pull print button is pressed.

FIG. 9 illustrates operations of the image forming system 10 when the pull print button 63 is pressed.

As illustrated in FIG. 9, when the pull print button 63, which is as the operation part of the operation screen 60, is pressed via the operation unit 51, the login unit 57a of the mobile device 50 requests the login process to the server 40 (S141). Accordingly, the control unit 45 of the server 40 performs the login process and replies the result of the login process to the mobile device 50 (S142).

When replied as the successful login at S142, the function execution unit 57c of the mobile device 50 requests a list of print data for pull print to the server 40 (S143). Accordingly, the control unit 45 of the server 40 replies the list of print data of the user who has succeeded the login among the print data 44e managed in the storage unit 44 to the mobile device 50 (S144).

Figure 10:
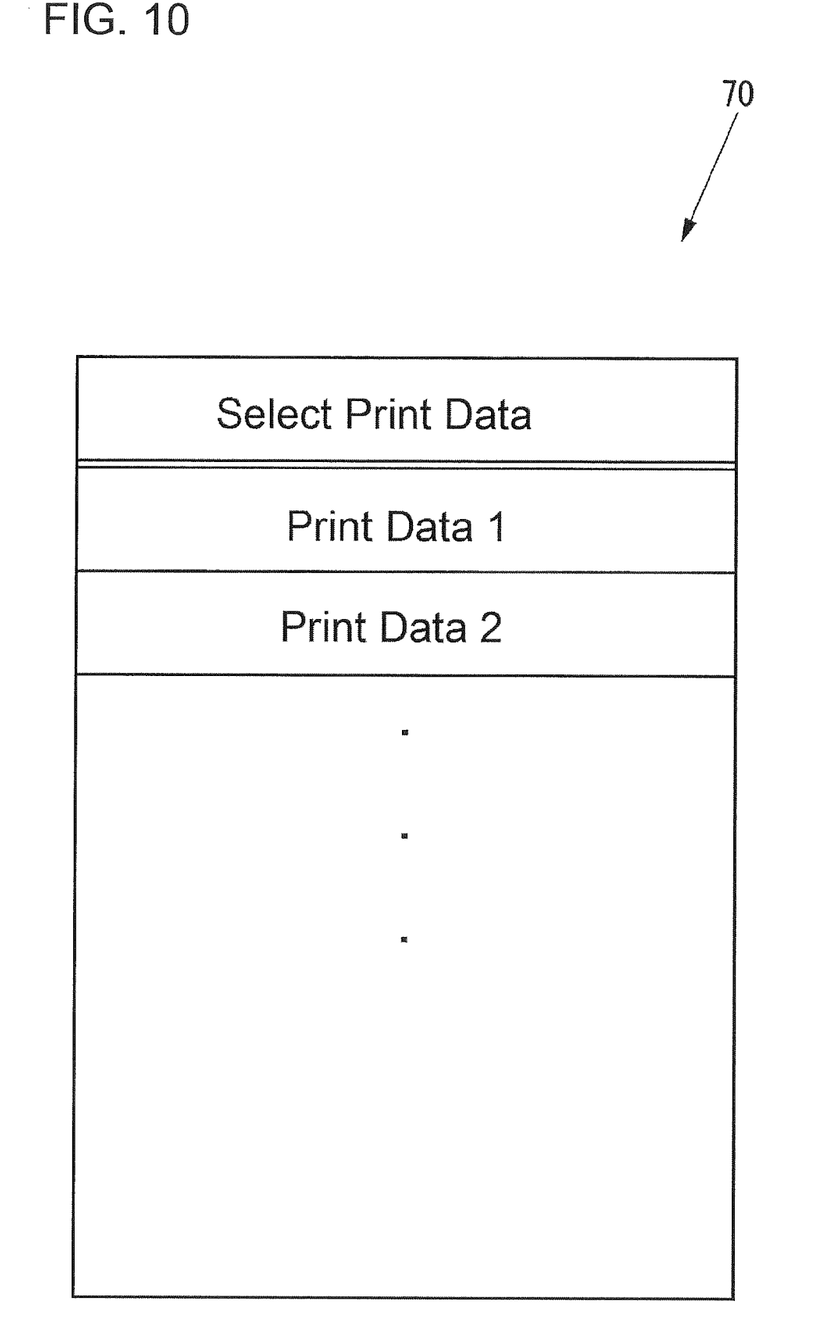
FIG. 10 is a schematic diagram of an example of the operation screen displayed on the display according to one embodiment and is an example different from the example illustrated in FIG. 6.

When the list is replied at S144, the operation screen display 57b of the mobile device 50 displays an operation screen 70, which is illustrated in FIG. 10, on the display 52 based on the list. Accordingly, the user can specify the print data to be pull-printed among the print data displayed in the operation screen 70 via the operation unit 51.

When the print data to be pull-printed is specified via the operation unit 51, the function execution unit 57c of the mobile device 50 notifies the server 40 of the identification information for the specified print data (S145). Accordingly, the control unit 45 of the server 40 transmits the specified print data to the image forming apparatus 30 to which the user logs in (S146). The control unit 45 causes the image forming apparatus 30 to perform printing based on this print data.

As described above, the image forming system 10 performs a function other than the functions executable by the image forming apparatus 30 alone and a specified function performed using the image forming apparatus 30 according to the operation to the operation part in the operation screen 60, which is displayed on the display 52 of the mobile device 50, via the operation unit 51 of the mobile device 50. This ensures extending the functions of the image forming apparatus 30.

For example, in some cases, the image forming apparatus 30 cannot singularly perform the function of the copy at the preset value by operating one button due to, for example, low performance of the model. However, even with the case, the image forming system 10 ensures performing the function using the image forming apparatus 30 by the operation via the operation unit 51 of the mobile device 50 to the simple copy button 61 in the operation screen 60, which is displayed on the display 52 of the mobile device 50. This ensures improving the convenience.

In some cases, the image forming apparatus 30 cannot singularly perform the function of the scan at the preset value by operating one button due to, for example, low performance of the model. However, even with the case, the image forming system 10 ensures performing the function using the image forming apparatus 30 by the operation via the operation unit 51 of the mobile device 50 to the simple scan button 62 in the operation screen 60, which is displayed on the display 52 of the mobile device 50. This ensures improving the convenience.

Especially, assume the case where the function performed by the operation via the operation unit 51 of the mobile device 50 to the simple scan button 62 is a reading transmission function. The reading transmission function transmits the image data read from a document by the image forming apparatus 30 to a specific address. Then, the image forming system 10 causes the server 40 to perform the transmission among the reading transmission function, thus ensuring the transmission to the address by transmitting method not supported by the image forming apparatus 30. For example, even if the image forming apparatus 30 does not support transmission with e-mails, the image forming system 10 is configured to transmit the image data read from a document by the image forming apparatus 30 to the server 40 with e-mail address.

In some cases, the image forming apparatus 30 cannot singularly perform the pull print function due to, for example, low performance of the model. The pull print function prints the print data selected by the user among the print data managed by the server 40 for the user who has succeeded the login by the image forming apparatus 30. However, even with the case, the image forming system 10 ensures performing the function using the image forming apparatus 30 by the operation via the operation unit 51 of the mobile device 50 to the pull print button 63 in the operation screen 60, which is displayed on the display 52 of the mobile device 50. This ensures improving the convenience.

The image forming system 10 may be configured to perform functions other than the functions described above. For example, the image forming system 10 may be configured to increase the number of permissions of the number of permissions information database 44d via the operation screen 60.

The image forming system 10 ensures changing the operation screen 60, which is displayed on the display 52 of the mobile device 50, depending on users, ensuring improving the convenience.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming system; comprising:
a mobile device including an operation circuit, a display; and an operation screen display that displays an operation screen to operate the image forming apparatus on the display, wherein the operation screen includes a copy button, a scan button, and a pull print button;
an image forming apparatus including a scanner and a printer; and
a server,
wherein:
when the copy button is pressed, the mobile device causes the server to perform a login process;
the server performs the login process and sends the result of the login process to the mobile device;
when the login process is successful, the mobile device causes the server to send to the mobile device a set value of a copy associated to the copy button and managed by the server;
the server sends to the mobile device the set value of the copy associated to the copy button and managed, wherein the set value of the copy includes a resolution for reading by the scanner and a color of printing by the printer;
the mobile device causes the image forming apparatus to perform the copy at the set value of the copy transmitted from the server; and
the image forming apparatus performs the copy at the set value of the copy transmitted from the mobile device by using the scanner and the printer.

2. The image forming system according to claim 1, wherein:
when the scan button is pressed, the mobile device causes the server to perform the login process;
the server performs the login process and sends the result of the login process to the mobile device;
when the login process is successful, the mobile device causes the server to send to the mobile device a set value of the scan associated to the scan button and managed by the server;
the server sends to the mobile device the set value of the scan associated to the scan button and managed, wherein the set value of the scan includes the resolution for reading by the scanner;
the mobile device causes the image forming apparatus to perform the scan at the set value of the scan transmitted from the server;
the image forming apparatus performs the scan at the set value of the scan transmitted from the mobile device by using the scanner;
the mobile device associates the image data read by the scanner with an identification information of the scan button, and causes the image forming apparatus to transmit to the server the image data and the identification information of the scan button associated to the image data; and
the server searches an address associated to the identification information of the scan button, and transmits the image data to the searched address.

3. The image forming system according to claim 2, wherein:
when the pull print button is pressed, the mobile device causes the server to perform the login process;
the server performs the login process and sends the result of the login process to the mobile device;
when the login process is successful, the mobile device causes the server to send to the mobile device a list of print data for a pull print;
the server sends to the mobile device the list of the print data of a user who has succeeded in the login process among the print data managed in the server;
when the list is replied, the mobile device displays the list of the print data on the display;
when the print data for the pull print is specified on the display, the mobile device notifies the server of identification information for the specified print data for the pull print; and
the server transmits the specified print data for the pull print to the image forming apparatus, and causes the image forming apparatus to perform printing the specified print data for the pull print.

* * * * *